July 22, 1941.  C. J. WHITCOMBE  2,249,923
SCREW AND NUT FASTENING
Filed Sept. 3, 1940
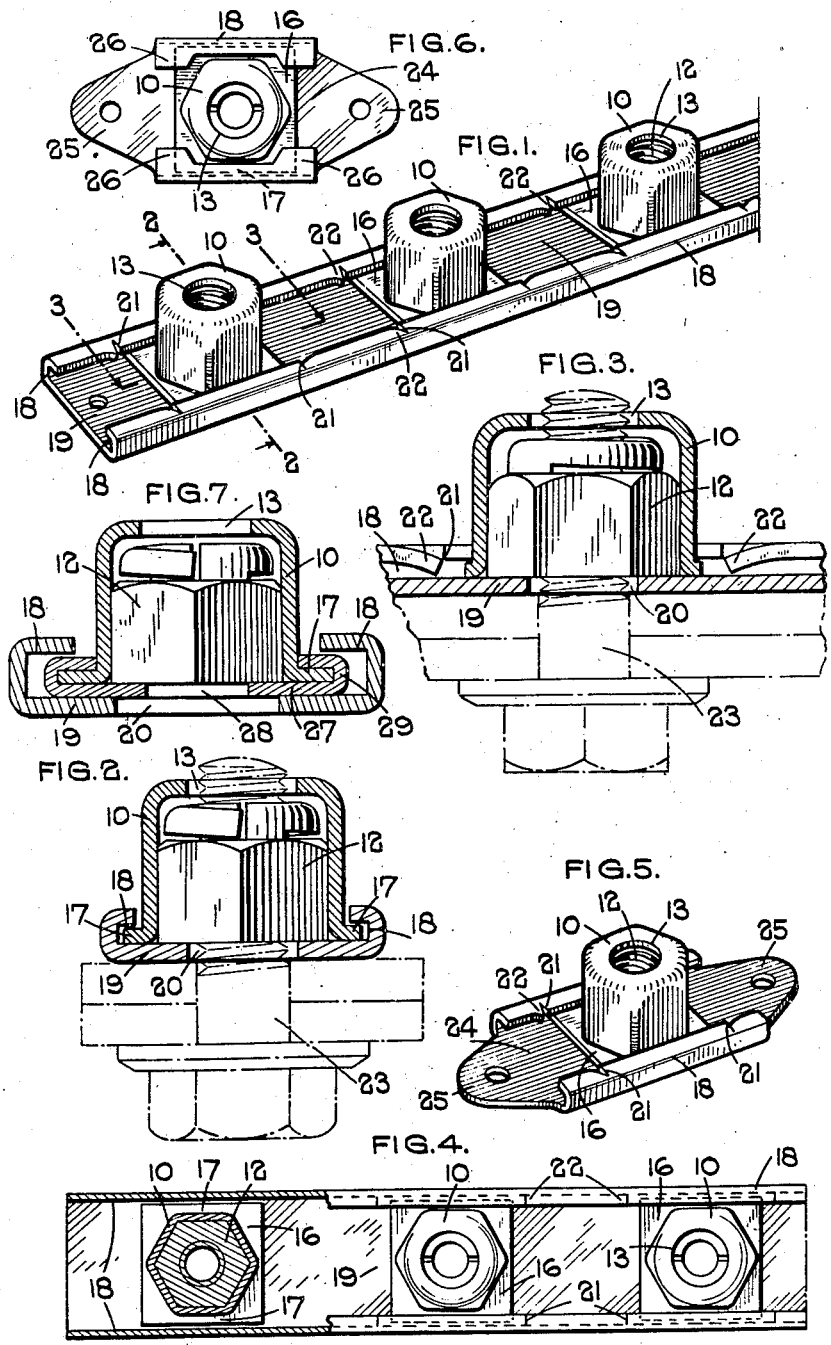
C. J. Whitcombe,
Inventor
Taulmin & Taulmin
Attorneys.

Patented July 22, 1941

2,249,923

UNITED STATES PATENT OFFICE 2,249,923

SCREW AND NUT FASTENING

Christopher John Whitcombe, Smethwick, England, assignor to Guest, Keen & Nettlefolds, Limited, Smethwick, England Application September 3, 1940, Serial No. 355,268 In Great Britain September 21, 1939

10 Claims. (Cl. 85—32)

This invention relates to screw and nut fastenings, and refers more particularly to that kind of fastening which includes an element incorporating one or more nuts mounted upon an attachment member and having a limited movement in relation thereto, but prevented from rotation about its own axis, the element being primarily intended for use in cases where a nut or nuts are difficult of access, or wherein access cannot be obtained thereto.

In such cases the attachment member is fixed to one of the members to be secured and is provided with a hole for each nut, which hole is larger than the bore of the nut so that the screws can be engaged therewith, and the movement permitted between the nut or nuts and the attachment member enables the nut or nuts to be brought into axial alignment with the screw or screws.

One of the objects of the present invention is to enable screws to be engaged with the nuts when the screw holes are not accurately spaced.

A further object of the present invention is to enable nuts formed from standard bar to be used.

A further object of the present invention is to enable screws to be engaged with the nuts when the axis of the screw hole is not accurately at right angles to the plane of the face of the attachment plate.

Referring to the drawing:

Figure 1 is a perspective view showing one construction in accordance with the present invention.

Figure 2 is a section on line 2—2 of Figure 1.

Figure 3 is a section on line 3—3 of Figure 1.

Figure 4 is a plan view partly in section.

Figure 5 is a perspective view of a modification.

Figure 6 is a plan view showing a further modification.

Figure 7 is a sectional view showing a further modification.

In the constructions illustrated in the drawing, each carrier plate 10 is formed initially as a flat plate but has its centre portion pressed to form a pocket for receiving a nut 12. The nut 12 shown is made in accordance with British Specification No. 515,929 but other forms of lock nuts may be used, or ordinary nuts. The end of the pocket is provided with an opening 13, which opening is larger in diameter than that of the bore of the nut.

Preferably the nuts are an easy fit in the pockets so that the possibility of the nut tilting or rocking slightly if required to bring the axis of its hole in line with the axis of the screw is not excluded. The nuts are of course prevented from turning about their own axes by the flats on the nuts and on the pockets.

Each carrier plate has a flat portion or flange 16, and this portion constitutes the laterally projecting lugs 17 which engage in channels 18 formed at the edges of the attachment plate 19. The width of the channels 18 may, as shown, be slightly greater than the thickness of the part 16 so that if a nut is a tight fit in its pocket a slight rocking movement of the nut and carrier plate is permitted for the purpose already referred to.

By mounting the nuts in carrier plates, nuts of ordinary form, i. e. made from standard section bar without being machined down, can be mounted in the attachment plate, the portions 16 of the carrier plates serving to retain the nuts on the attachment plate.

The attachment plate is provided with a number of spaced holes 20, one for each nut, and these holes are of larger diameter than the diameter of the bore of the nut.

The attachment plate is of channel section and the carrier plates containing the nuts are slidden along the channel until they reach the correct positions.

The attachment plate is provided with stop means which permit some movement by each carrier plate along the attachment plate but serve to limit such movement.

As shown, the edges of the attachment plate are slit at various spaced positions as indicated at 21, and after the nuts and carrier plates are in position in the channel the metal 22 at one side of each slit is bent downwardly to form a stop. Slitting is not essential as the stops can be formed by indenting the edges of the plate 19 or by the method to be hereinafter described with reference to Figure 6.

It will be seen that the stops 22 are spaced apart by a distance somewhat greater than the length of the part 16 of each carrier plate, so that each carrier plate can make a short limited movement along the length of the channel.

Further, it will be seen that the width between the bases of the channels 18 is somewhat greater than the width of each part 16, so that the carrier plates are able to make a short limited movement transversely in relation to the channel. In practice, when a screw such as 23 is inserted in the nut it turns the nut and its carrier plate about its own axis until diagonally opposite corners of the part 16 come into contact with the bases of the channel. After this position has been reached the nut and carrier plate does not move and rattle is thus prevented after the screws are in position.

Referring to Figure 3, it will be seen that the assembly is placed upon one side of the work and the screws 23 are inserted from the other side. Should the holes in the work be slightly out of position the freedom of movement permitted to the nuts and carrier plates enables the screws to engage in the nuts without difficulty.

The carrier plate 19 is preferably provided with a number of holes in its base placed between the positions where the nuts and their carrier plates are situated, so that the carrier plate can be secured to the work by riveting or similar means.

A modification is shown in Figure 5, wherein a single nut and carrier are mounted upon a short attachment plate 24 having lugs 25 at its ends by which it may be secured in position.

In this construction the stops 22 are formed by the same method as that shown in Figures 1 and 3.

An alternative construction is shown in Figure 6 wherein the stops for limiting the longitudinal movement of the carrier plate are formed as integral lugs 26 on the edge of the plate 24, these lugs engaging with the pocket portion of the carrier plate 10. Two of the lugs 26 at one end of the assembly are not bent down into position until after the carrier plate containing the nut has been placed in position.

This method of providing the stops may also be used in connection with an assembly containing several nuts as shown in Figure 1, and in such a construction all the lugs 26, except two situated at one end of the attachment plate are initially formed so that they are bent away from the attachment plate to allow carrier plates containing the nuts to be slidden into position. The lugs 26 are afterwards bent down into their operative position.

In cases where a large amount of floating movement for the nut is required the holes 20 in the attachment plate may be so large that there is danger of the nut dropping through such holes, and in such cases the construction shown in Figure 7 may be used, wherein the nut is retained in the pocket of the carrier plate 10 by a cover plate 27 having a hole 28 which is only slightly larger than the bore of the nut. The cover plates 27 have their edges 29 bent over to embrace the edges of the parts 16 of the carrier plates, and the channels 18 are made wide enough to receive the edges 29 of the cover plates.

What I claim then is:

1. A screw fastening element comprising an attachment plate having edges of channel form, a carrier plate having a pocket and a flange, opposite edges of the flange engaging in said channels, the distance between said edges being less than the distance between the bases of the channels, stop means on the attachment plate adapted to engage with said carrier plate, and a nut non-rotatably mounted in said pocket, said pocket having an end portion which completely encloses the end of the nut except for the bore, and said pocket being of greater depth than the thickness of the nut, said attachment plate having an opening of larger diameter than that of the bore of the nut, said opening registering approximately with the bore of the nut.

2. A screw fastening element comprising an attachment plate having edges of channel form, a carrier plate having a pocket and a flange, opposite edges of the flange engaging in said channels, the distance between said edges being less than the distance between the bases of the channels, portions of the edges of the channels near the ends of the carrier plate being bent down to form stops to limit movement of the carrier plate along the length of the attachment plate, and a nut non-rotatably mounted in said pocket, said pocket being of cup like form of greater depth than the thickness of the nut and having its end formed by a continuous inwardly directed flange completely covering the end of the nut except for the bore, said attachment plate having an opening of larger diameter than that of the bore of the nut, said opening registering approximately with the bore of the nut.

3. A screw fastening element comprising an attachment plate having edges of channel form, a carrier plate having a pocket and a flange, opposite edges of the flange engaging in said channels, the distance between said edges being less than the distance between the bases of the channels, lugs on the edges of the attachment plate adapted to engage with said pocket to limit movement of the carrier plate parallel to the channels, and a nut non-rotatably mounted in said pocket, said pocket being of cup like form of greater depth than the thickness of the nut and having its end formed by a continuous inwardly directed flange completely covering the end of the nut except for the bore, said attachment plate having an opening of larger diameter than that of the bore of the nut, said opening registering approximately with the bore of the nut.

4. A screw fastening element comprising an attachment plate having edges of channel form, a carrier plate having a pocket and a flange, a nut non-rotatably mounted in said pocket, said pocket being of cup like form of greater depth than the thickness of the nut and having its end formed by a continuous inwardly directed flange completely covering the end of the nut except for the bore, and a cover plate extending across the flange of the carrier plate and retaining the nut in the pocket, said cover plate having an opening as large as the bore of the nut and registering therewith, opposite edges of the cover plate embracing edges of the flange and engaging in said channels, the distance between said edges being less than the distance between the bases of the channels, said attachment plate having an opening approximately registering with the opening in the cover plate and of larger diameter than that of the cover plate opening.

5. A screw fastening element comprising an attachment plate having edges of channel form, a plurality of carrier plates each having a pocket and a flange, a nut non-rotatably mounted in each of said carrier plates, the carrier plates containing the nuts being mounted at intervals along the length of the attachment plate, opposite edges of the flanges on the carrier plates engaging loosely in the channels of the attachment plate, permitting the end face of the nut to move out of parallelism with the face of the attachment plate, stop means on the attachment plate adapted to engage opposite ends of each carrier plate to permit but limit movement of the carrier plates along the attachment plate, said attachment plate having openings approximately registering with the bores of the nuts, and having further openings in between some of the carrier plates whereby it may be secured to another structure.

6. A screw fastening element comprising an attachment plate having edges of channel form, a carrier plate having a pocket and a flange, opposite edges of the flange engaging in said channels, the distance between said edges being less than the distance between the bases of the channels, stop means on the attachment plate adapted to engage with said carrier plate, and a nut non-rotatably but rockably mounted in said pocket permitting the end face of the nut to move out of parallelism with the face of the attachment plate, said attachment plate having an opening of larger diameter than that of the bore of the nut, said opening registering approximately with the bore of the nut.

7. A screw fastening element comprising an attachment plate having edges of channel form, a carrier plate having a pocket and a flange, opposite edges of the flange engaging in said channels, the distance between said edges being less than the distance between the bases of the channels, the thickness of said flange being less than the width of said channels so that the carrier plate has a limited rocking movement on the attachment plate permitting the end face of the nut to move out of parallelism with the face of the attachment plate, stop means on the attachment plate adapted to engage with said carrier plate, and a nut non-rotatably mounted in said pocket, said attachment plate having an opening of larger diameter than that of the bore of the nut, said opening registering approximately with the bore of the nut.

8. A screw fastening element comprising an attachment plate having edges of channel form, a carrier plate having a pocket and a flange, a nut non-rotatably mounted in said pocket, stop means on the attachment plate adapted to engage with said carrier plate, and a cover plate extending across the flange of the carrier plate and retaining the nut in the pocket, said cover plate having an opening as large as the bore of the nut and registering therewith, opposite edges of the cover plate embracing edges of the flange and engaging in said channels, the distance between said edges being less than the distance between the bases of the channels, the width of said channels being greater than that provided by the embracing ends of the cover plate, permitting the end face of the nut to move out of parallelism with the face of the attachment plate, said attachment plate having an opening approximately registering with the opening in the cover plate and of larger diameter than that of the cover plate opening.

9. A screw fastening element comprising an attachment plate having edges of channel form, a carrier plate having a pocket and a flange, a nut non-rotatably mounted in said pocket, and a cover plate extending across the flange of the carrier plate and retaining the nut in the pocket, said cover plate having an opening as large as the bore of the nut and registering therewith, adjacent edges of the cover plate and the carrier plate being secured together and forming flanges engaging in said channels, the thickness of said flange being less than the width of said channels so that the carrier plate has a limited rocking movement on the attachment plate permitting the end face of the nut to move out of parallelism with the face of the attachment plate, the distance between said edges being less than the distance between the bases of the channels, stop means on the attachment plate adapted to engage with said carrier plate, said attachment plate having an opening approximately registering with the opening in the cover plate and of larger diameter than that of the cover plate opening.

10. A screw fastening element comprising an attachment plate having edges of channel form, a carrier plate having a pocket and a flange, opposite edges of the flange engaging in said channels, the distance between said edges being less than the distance between the bases of the channels, stop means on the attachment plate adapted to engage with said carrier plate, and a nut non-rotatably mounted in said pocket, said pocket being of cup like form of greater depth than the thickness of the nut and having its end formed by a continuous inwardly directed flange completely covering the end of the nut except for the bore, said nut being an easy fit in said pocket permitting the end face of the nut to move out of parallelism with the face of the attachment plate, said attachment plate having an opening of larger diameter than that of the bore of the nut, said opening registering approximately with the bore of the nut.

CHRISTOPHER JOHN WHITCOMBE.